(12) United States Patent
Goel

(10) Patent No.: US 9,817,913 B2
(45) Date of Patent: Nov. 14, 2017

(54) METHOD AND APPARATUS FOR COLLECTING, MERGING AND PRESENTING CONTENT

(75) Inventor: Naveen Prakash Goel, Noida (IN)

(73) Assignee: ADOBE SYSTEMS INCORPORATED, San Jose, CA (US)

(*) Notice: Subject to any disclaimer, the term of this patent is extended or adjusted under 35 U.S.C. 154(b) by 476 days.

(21) Appl. No.: 13/485,981

(22) Filed: Jun. 1, 2012

(65) Prior Publication Data
US 2013/0326329 A1  Dec. 5, 2013

(51) Int. Cl.
*G06F 17/30* (2006.01)
(52) U.S. Cl.
CPC ............... *G06F 17/30893* (2013.01)
(58) Field of Classification Search
USPC .......................................................... 715/234
See application file for complete search history.

(56) References Cited

U.S. PATENT DOCUMENTS

| | | | | |
|---|---|---|---|---|
| 8,060,470 B2 * | 11/2011 | Davidson | ......... | G06F 17/30306 707/634 |
| 8,095,975 B2 | 1/2012 | Boss et al. | | |
| 2004/0120013 A1 | 6/2004 | Elkady et al. | | |
| 2004/0201613 A1 * | 10/2004 | Simpson | ................ | H04L 67/02 715/738 |
| 2005/0055644 A1 * | 3/2005 | Stockton | ........... | G06F 17/30905 715/766 |
| 2005/0289182 A1 * | 12/2005 | Pandian et al. | ............ | 707/104.1 |
| 2007/0136443 A1 * | 6/2007 | Sah | ................... | G06F 17/30867 709/219 |
| 2008/0307296 A1 * | 12/2008 | Maglanque | ........... | G06F 3/1208 715/202 |
| 2008/0319649 A1 * | 12/2008 | Nath | ...................... | G06Q 50/14 701/439 |
| 2009/0006338 A1 * | 1/2009 | Ives | .................. | G06F 17/30905 |
| 2009/0044140 A1 * | 2/2009 | Chen | ...................... | G06F 3/0481 715/770 |
| 2009/0241183 A1 * | 9/2009 | Boss | ...................... | G06F 17/218 726/17 |
| 2009/0326968 A1 | 12/2009 | Lopez | | |
| 2010/0315431 A1 | 12/2010 | Smith et al. | | |
| 2011/0007352 A1 * | 1/2011 | Kobashi | ............. | H04N 1/00206 358/1.15 |
| 2011/0119571 A1 * | 5/2011 | Decker | ............. | G06F 17/30902 715/205 |
| 2014/0129597 A1 * | 5/2014 | Dong | ........................... | 707/803 |

OTHER PUBLICATIONS

Arnold W.M. Smeulders, Content-Based Image Retrieval, Dec. 2000, IEEE Transactions on Pattern Analysis and Machine Learning, vol. 22, No. 12, pp. 1349-1380.*

* cited by examiner

*Primary Examiner* — Andrew Dyer
*Assistant Examiner* — Ahmad M El-Bkaily
(74) *Attorney, Agent, or Firm* — Keller Jolley Preece

(57) ABSTRACT

A method and apparatus for collecting, merging, and presenting content is disclosed. The method includes collecting a plurality of selected content from a plurality of different content sources. The method further involves storing the selected content in a temporary file. Additionally, the method involves merging the collected content into a cohesive document.

20 Claims, 6 Drawing Sheets

METHOD AND APPARATUS FOR COLLECTING, MERGING AND PRESENTING CONTENT

BACKGROUND OF THE INVENTION

Field of the Invention

Embodiments of the present invention generally relate to content management and, more particularly, to a method and apparatus for collecting, merging, and presenting content.

Description of the Related Art

Currently, collecting, merging and presenting information from various applications and/or browsers into a single document suitable for display and printing requires cumbersome copy-paste operations or manually laying out of content. Generally, a user selects content from various web pages or other resources in order to collect pertinent information for a subject of interest. For example, if the user is gathering information for a trip, the user may navigate to different websites, news sources, on-line magazines, blogs, articles and the like. The user must copy and paste the desired content from each of these different resources into a single document. In addition, much of the selected content includes advertisements and/or other information not relevant to the user's subject of interest, such as headers and footers, and navigation links, which a user may want to have eliminated before printing a final document. Furthermore, because the information obtained from each of a plurality of unrelated sources is mostly likely formatted differently, the end result appears to be a haphazard collection of segregated objects copied into a single document rather than a single cohesive merged document which can be used for display and/or printing.

One conventional technique allows users to take "snapshots" of content from different application windows or browser pages. However, content collected this way cannot be edited. It may be scaled, but then the content loses fidelity. As a consequence, if the collected content contains text, the readability of the content decreases considerably when displayed and/or printed.

Another technique allows "soft-printing", where the collected content is saved to a document. "Send to OneNote" is such a solution from MICROSOFT. The information is essentially static, and cannot be edited. This workflow is not very straightforward, and is cumbersome, involving multiple clicks.

Therefore, there is a need for a method and apparatus for collecting, merging, and presenting content in a cohesive document.

SUMMARY OF THE INVENTION

The present invention provides a method and apparatus for collecting, merging, and presenting content in a cohesive document. In one embodiment, the method comprises collecting a plurality of selected content from a plurality of different content sources. The selected content is stored in a temporary file and then merged into a cohesive document.

Figure 1:
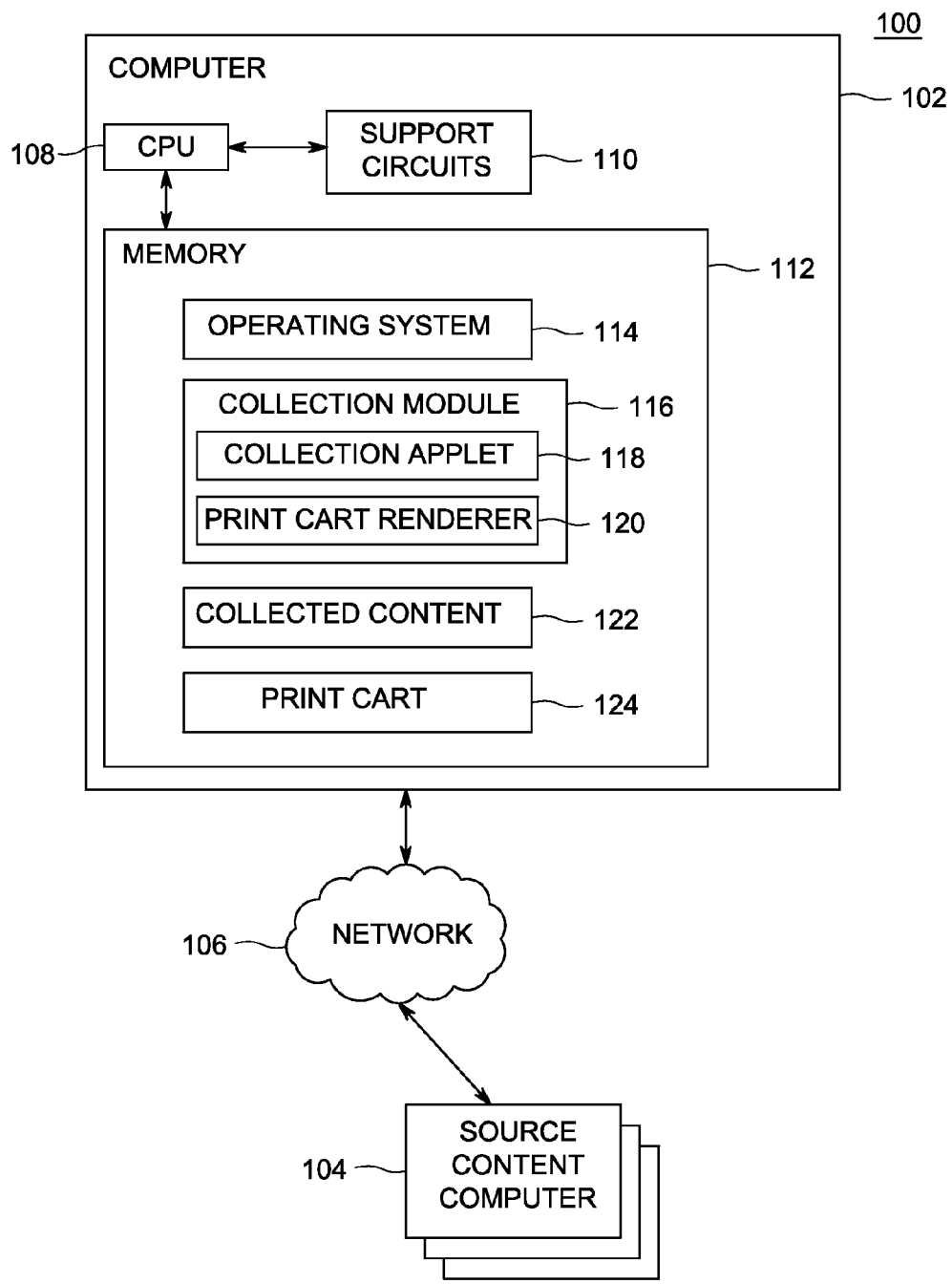
FIG. 1 depicts a block diagram of a system for collecting and merging content and optimizing the output content, according to one or more embodiments of the invention.

While the method and apparatus is described herein by way of example for several embodiments and illustrative drawings, those skilled in the art will recognize that the method and apparatus for collecting, merging, and presenting content are not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for collecting, merging, and presenting content as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention comprise a method and apparatus for collecting, merging, and presenting content of interest. The embodiments enable a user to collect content from a plurality of different sources, using a variety of methods, merge the content into a cohesive layout, and then provide an optimized presentation of the layout that gives the appearance of a single merged document from a collection of content received from a plurality of different sources. In one embodiment, the optimized presentation of the layout is print-optimized for efficient paper-and-ink usage.

In one embodiment, a user navigates via a web browser to different content sources such as web pages, documents, files, and the like. At each content source, the user may elect to collect selected content contained at that content source that is of interest to the user. When the user chooses to collect the content, the content may be stripped of all advertisements, navigation elements and other content not relevant to the user's interest and copied into a common markup language or rich format, such as a Hyper-Text Markup Language (HTML) object. Collected content that is not inherently supported by HTML, such as charts and diagrams, are first converted into an optimized image (raster) and then the converted image is stored in the HTML object as collected content. As the user navigates to other content sources and elects to collect the content, the content is stored as objects in the order in which it is collected. When the user has completed the collection process, the collected content is displayed for the user, so the content may be edited, regrouped or reordered. The content is then laid out in an optimized presentation format such as an optimized paper-ink usage format ready for printing or display.

In another embodiment, a user may open a web browser, document or other content source. The user then selects an object within the content source that is of interest to the user and elects to collect similar objects, e.g., by object type or other object characteristic. The object may be an image, a text paragraph, a table, list, chart, diagram, and/or the like. As described above, when the user chooses to collect the content, it is copied into a common rich format, such as an HTML object. The method traverses (parses) the source document structure and object model, optimally extracts the object's information, finds all similar objects in the source document, and copies their content into an HTML object. To find similar objects quickly and efficiently, the method parses the source document structure and object model, and creates an internal Map containing a list of references to objects of similar type. All objects of the same object type in currently selected (active) document windows or browser pages (tabs) are automatically stored in the order in which they are collected. The collected content is then displayed for the user, so the content may be edited, regrouped or reordered. The content is then laid out in an optimized presentation format such as an optimized paper-ink usage format ready for printing or display.

In another embodiment, a user may elect to collect content that is of interest. The user will select at least one type of object to collect, for example, an image, a text paragraph, a table, list, chart, diagram, or the like and then enter up to, for example, twenty (20) keywords which are criteria for the content of interest the user wishes to capture. The user activates the capturing of content by, for example, selecting a "Start Capture" button on a user interface. Then, as the user navigates through web pages and documents, content of the specified object type(s) that meets the entered keyword criteria, is automatically collected. Content collection continues until the user deactivates the capturing of content by, for example, selecting a "Stop Capture" button on the user interface. As described above, as the content is collected, it is copied into a common rich format, such as an HTML object, and stored. The collected content is then displayed for the user, so the content may be edited. The content is then laid out in an optimized presentation format such as an optimized paper-ink usage format ready for printing or display.

In an even further embodiment, a user may desire to compile relevant chapters, sections, and/or pages of interest from books or other periodicals from online bookstores and/or libraries rather than purchase complete books or magazines from online vendors. The user may collect content from, for example, online books, magazines, research papers, white papers, articles, blogs and the like, to create a customized personalized book containing only the content that is of relevance to the user. The user navigates through different online books and other sources, selects relevant chapters or portions of relevance, and collects the content in a customized book. This relevant content may be purchased as modular sellable content. As the user selects modular sellable content (chapter, section, pages, and other individually sellable portions), a current cost of the customized book, which is an accumulation of the cost of all selected components minus applicable discounts and promotions, is displayed to the user.

Various embodiments of an apparatus and method for collecting, merging, and presenting content are described. In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 depicts a block diagram of a system for collecting and merging content and optimizing the output content, according to one or more embodiments of the invention. The system 100 includes a computer 102 and one or more source content computers 104 communicatively coupled to one another through a network 106.

According to some embodiments, the source content computers 104 are a type of computing device (e.g., a laptop, a desktop, a Personal Digital Assistant (PDA) and/or the like) known to one of ordinary skill in the art. The source content computer 104 comprises a plurality of contents. In some embodiments, the contents may be selected from various resources, such as web pages, PDF, MIRCROSOFT OFFICE applications, such as WORD, EXCEL, POWERPOINT and OUTLOOK documents among others. Broadly speaking, the content may be extracted from a digital document of any format that permits extraction of the document or a portion thereof.

The network 106 comprises a communication system that connects computers by wire, cable, fiber optic and/or wireless link facilitated by various types of well-known network elements, such as hubs, switches, routers, access points and the like. The network 106 may employ various well-known protocols to communicate information amongst the network resources. For example, the network 106 may be a part of the Internet or Intranet using various communications infrastructure, such as Ethernet, Wi-Fi, Wi-Max, General Packet Radio Service (GPRS), and the like.

The computer 102 comprises a CPU 108, support circuits 110, and a memory 112. The computer 102 is a type of computing device (e.g., a laptop, a desktop, a Personal Digital Assistant (PDA) and/or the like) known to one of ordinary skill in the art. The CPU 108 may comprise one or more commercially available microprocessors or microcontrollers that facilitate data processing and storage. The various support circuits 110 facilitate the operation of the CPU 108 and include one or more clock circuits, power supplies, cache, input/output circuits, displays, and the like. The memory 112 comprises at least one of Read Only Memory (ROM), Random Access Memory (RAM), disk drive storage, optical storage, removable storage and/or the like. The memory 112 comprises an operating system 114, a collection module 116, a collected content 122, and a print cart 124. The collection module 116 comprises a collection applet 118 and a print cart renderer 120.

According to some embodiments, the operating system (OS) 114 generally manages various computer resources (e.g., network resources, file processors, and/or the like). The operating system 114 is configured to execute operations on one or more hardware and/or software modules, such as Network Interface Cards (NICs), hard disks, virtualization layers, firewalls and/or the like. Examples of the operating system 114 may include, but are not limited to, LINUX, MAC OSX, BSD, UNIX, MICROSOFT WINDOWS, and the like.

In general, an applet is an application that performs one specific task that runs within the scope of a larger program, often as a plug-in. According to some embodiments, the user launches the collection module 116, from within applications and browser windows that support ADOBE LeanPrint cart. In one embodiment, a user opens a web page in a browser, which displays content from a source content computer 104. The user then activates the collection module 116. When the collection module 116 is activated, the user selected content on the currently opened web page or document window is read into a common rich format, such as an HTML object and stored as collected content 122. Herein as an exemplary embodiment, HTML will represent any common rich markup language or format. The user may navigate to other web pages, PDF, WORD, EXCEL, POWERPOINT and OUTLOOK documents. The user may activate the collection module 116 from within any or all of these sources. When the collection module 116 is activated, the collection module 116 stores the content as collected content 122 as HTML objects. Content that is not inherently supported by HTML, such as charts and diagrams, are first converted into an optimized image (raster) and then the converted image is stored as collected content 122. When content collection is complete, the user activates the collection applet 118. The collection applet 118 displays the collected content 122 to the user via a display (not shown) in the order the content was collected. The user can re-arrange the collected content or edit the content to remove redundant information. The user then activates the print cart renderer 120 which automatically and seamlessly merges the collected content into single integrated document optimized for presentation, such as an optimized paper-ink usage format in the print cart 124. The user may then print the print cart 124 to receive the collected content 122 in a cohesive merged document formatted for optimal paper-ink usage or save the document for display, printing at a later time, or sharing electronically with others.

In another embodiment, the user selects an object from a content source computer 104 and activates the collection module 116. As the user navigates through different content sources 104, all objects of the type selected by the user are automatically collected and read into an HTML object and stored as collected content 122. The user then activates the collection applet 118. The collection applet 118 displays the collected content 122 to the user via a display (not shown) in the order the content was collected. The user may optionally re-arrange cart items or edit the content to remove redundant information. The user then activates the print cart renderer 120 which automatically and seamlessly merges the collected content into single integrated document optimized for presentation, such as an optimized paper-ink usage format in the print cart 124. The user may then print the print cart 124 to receive the collected content 122 in a cohesive merged document formatted for optimal paper-ink usage or save the document for display, printing at a later time, or sharing electronically with others.

In yet another embodiment, a user activates the collection applet 118 within the collection module 116 and then selects at least one type of object to collect. The user then enters up to twenty (20) keywords corresponding to the subject matter which the user is interested in collecting. Thereafter, as the user navigates through web pages and documents, content of the object type selected that meets the keyword criteria entered, is automatically collected. The relevant content is collected and read into an HTML object and stored as collected content 122. When content collection is complete, the collection applet 118 allows the content to be edited, or rearranged. The user then activates the print cart renderer 120 which automatically and seamlessly merges the collected content into single integrated document optimized for presentation, such as an optimized paper-ink usage format in the print cart 124. The user may then print the print cart 124 to receive the collected content 122 in a cohesive merged document formatted for optimal paper-ink usage or save the document for display, printing at a later time, or sharing electronically with others.

Figure 2:
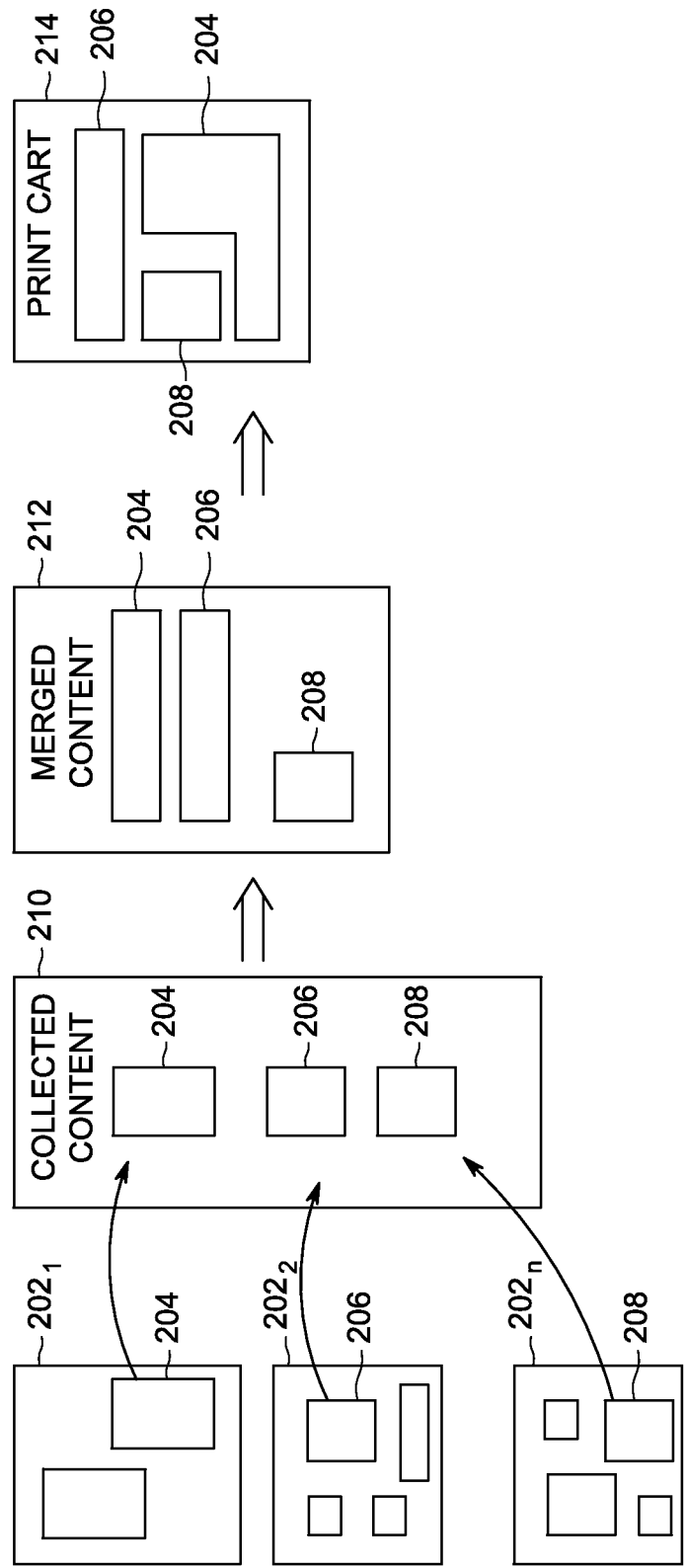
FIG. 2 depicts a schematic illustrating collecting, merging and presenting collected content collected using the methods of FIG. 3, FIG. 4, FIG. 5 and FIG. 6 below, according to one or more embodiments of the invention.
Figure 3:
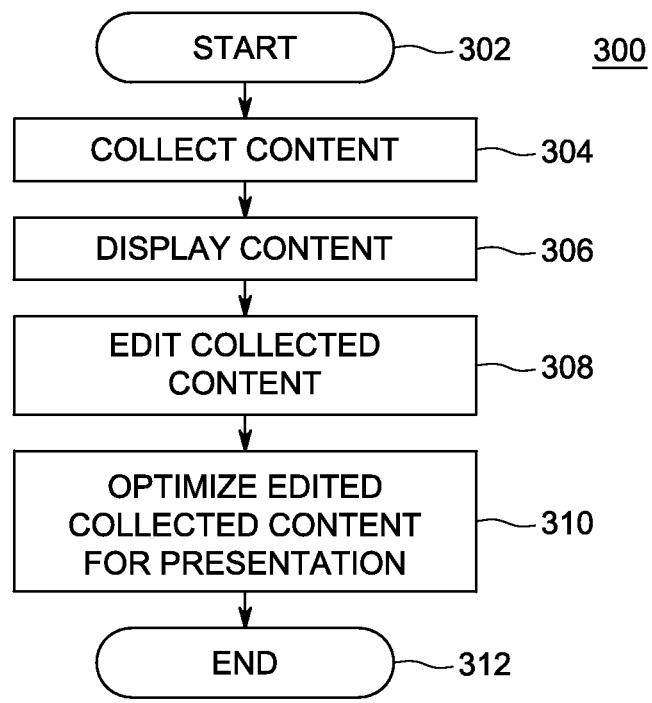
FIG. 3 depicts a flowchart of a method for collecting and merging content and optimizing the output content, as performed by the collection module of FIG. 1, according to one or more embodiments of the invention.

FIG. 2 depicts a schematic 200 illustrating collecting, merging and presenting collected content which is collected using the methods of FIG. 3, FIG. 4, FIG. 5 and FIG. 6 below, according to one or more embodiments of the invention. The schematic 200 illustrates a plurality of content sources $202_1$, $202_2$ ... $202_n$ (collectively 202). For example, content source $202_1$ is a web page containing content 204, comprised of text in a first font. Content source $202_2$ is a WORD document containing content 206, comprising text in a second font. Content source $202_n$ is a POWERPOINT presentation containing content 208, comprising a diagram. Content 204 is collected first, content 206 is collected second, and content 208 is collected last.

As content is collected, all ads, navigation elements and other useless content (i.e., content not relevant to the user's interest) such as headers and footers, may be automatically removed. The content is read into an HTML object. The collected text content, content 204 and content 206 are read into an HTML object. Because diagrams are not inherently supported by HTML, content 208, is first converted into an optimized image (raster) and then the converted image is saved. All collected content is stored as collected content 210. The collected content is merged to look like one cohesive document rather than a collection of segregated objects and then displayed to the user as merged content 212. All content that was stored as text in an HTML object will be displayed in the same font, size, and style, regardless of the font in which the text was collected. Also, text collected from multiple sources will be re-flowed into one single text block. Other content, for example, content 208, will be displayed as an image. The images will be optimally positioned in the output to preserve source context and make output aesthetic and readable and give the appearance that the entire content was originally collected from the same source. At this point, the user may rearrange the content or remove any unwanted or redundant content. In this example the user chooses to move content 204 to the end of the merged content 212. When the merged content 212 is optimized for presentation and printing, the print cart 214 contains the collected content in the order specified by the user, presented in a manner that requires minimal space and appears to be from a single source.

The method 300 starts at step 302, and proceeds to step 304. At step 304, the method 300 collects content. In some embodiments, the content is selected from a plurality of content sources such as web pages, PDF, WORD, EXCEL, POWERPOINT and OUTLOOK documents, and the like. In one embodiment, described further in FIG. 4 below, a command to copy content is received at each content source where a user seeks to collect content. In another embodiment, described further in FIG. 5 below, a command to copy a specific type of content is given and as a user navigates to each content source, the content of the selected content type is automatically collected.

The method 300 starts at step 302, and proceeds to step 304. At step 304, the method 300 collects content. In some embodiments, the content is selected from a plurality of content sources such as web pages, PDF, Word, Excel, PowerPoint or Outlook documents, and the like. In one embodiment, described further in FIG. 4 below, a command to copy content is received at each content source where a user seeks to collect content. In another embodiment, described further in FIG. 5 below, a command to copy a specific type of content is given and as a user navigates to each content source, the content of the selected content type is automatically collected.

As content is collected, all ads, navigation elements and other useless content (i.e., content not relevant to the users interest) such as headers and footers, are automatically removed. The content is read into an HTML object. Collected content that is not inherently supported by HTML, such as charts and diagrams, is first converted into an optimized image (raster) and then the converted image is stored as collected content. The method 300 proceeds to step 306. At step 306, the method 300 displays the collected content. In some embodiments, the method 300 displays all content as low-resolution non-printable thumbnails of the collected content, in the order they were added to the collected content. The method 300 proceeds to step 308.

At step 308, the method 300 provides for editing of the collected content. The collected content may be edited to reorder the collected content and to remove redundant and/or irrelevant information. The method 300 proceeds to step 310. At step 310, the method 300 formats the edited collected content to look like one cohesive document, rather than a collection of segregated objects. The method 300 optimizes the edited collected content in the layout for efficient display and paper-ink-usage. In other words, the content is optimized to take minimal space and ink without compromising the aesthetics and readability aspects when printed. The method 300 then prints the edited collected content in the paper-and-ink optimized format, or saves the document for display, printing at a later time, or sharing electronically with others. The method 300 proceeds to step 312 at which the method 300 ends.

Figure 4:
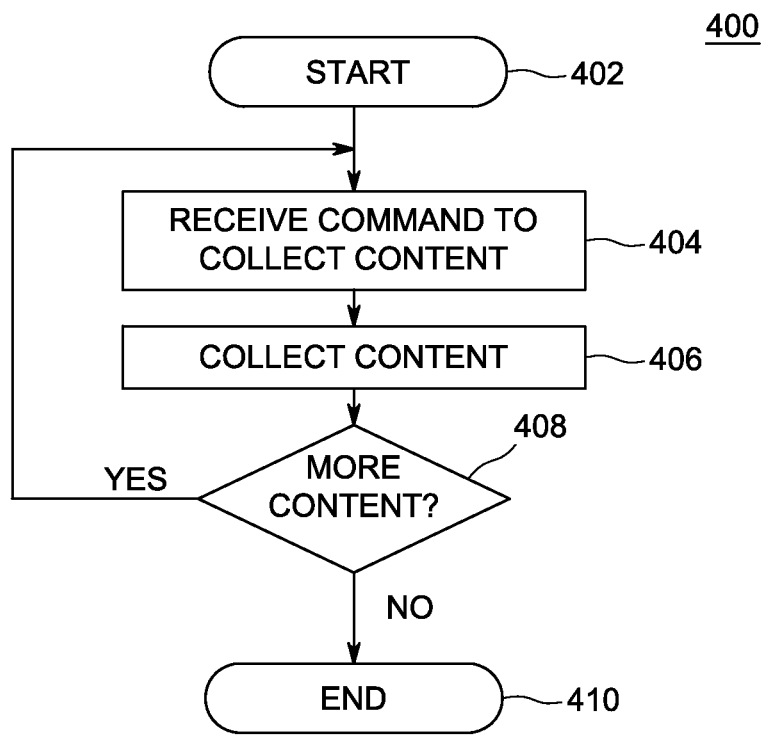
FIG. 4 depicts a flowchart of a method for collecting content as performed by the collection module of FIG. 1, according to an embodiment of the invention.

FIG. 4 depicts a flowchart of a method 400 for collecting content as performed by the collection module of FIG. 1, according to an embodiment of the invention. Method 400 is useful for collecting content in accordance with the method 300 of FIG. 3. Any number of content sources may be navigated. In accordance with method 400, content of interest is only collected from those sources where the command to collect content is received.

The method 400 starts at step 402, and proceeds to step 404. At step 404, the method 400 receives a command to collect selected content at a content source. The content source may be at least one of, for example, a web page, PDF, WORD, EXCEL, POWERPOINT and OUTLOOK document or any other form of information storage. The method 400 proceeds to step 406. At step 406, when the command to collect content is received, all selected content at the content source is read into an HTML object. Collected content that is not inherently supported by HTML, such as charts and diagrams, is first converted into an optimized image (raster) and then the converted image is stored as collected content. The content may be stripped of all advertisements, navigation elements and other content not relevant to the content of interest.

At step 408, the method 400 determines whether there are more content to be collected. A plurality of content sources may be navigated. Selections from web pages in a plurality of tabs of a browser or a plurality of documents and images may be collected. All selected content is stored in the order in which it is collected. If the method 400 determines there is more content to be collected, the method 400 proceeds to step 404. The method 400 iterates until there is no more content to be collected. At step 408, when it is determined that no more content to be collected, the method 400 proceeds to step 410 and ends.

Figure 5:
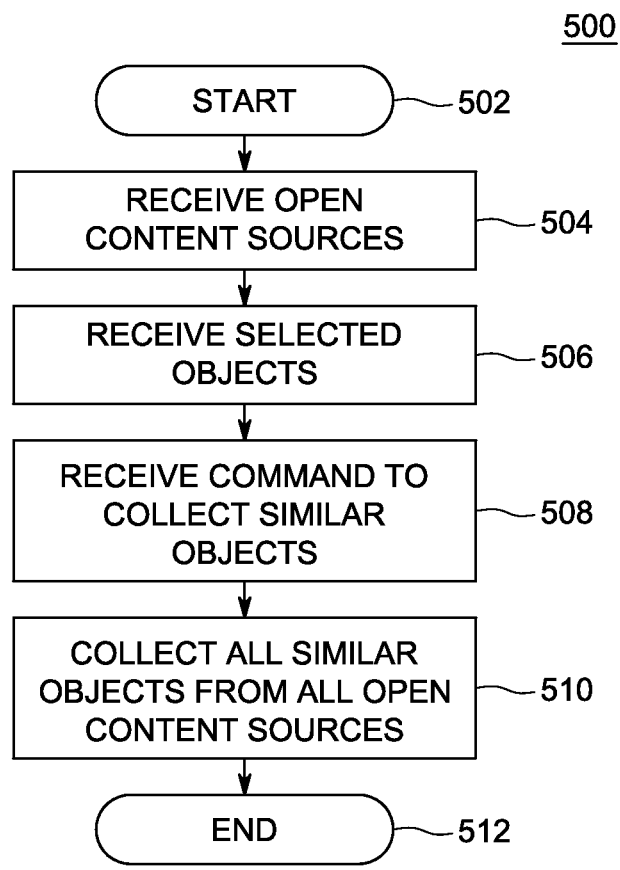
FIG. 5 depicts a flowchart of a method for collecting content as performed by the collection applet of FIG. 1, according to one embodiment of the invention.

FIG. 5 depicts a flowchart of a method 500 for collecting content as performed by the collection applet of FIG. 1, according to an embodiment of the invention. Method 500 is useful for collecting content in accordance with the method 300 of FIG. 3. In accordance with method 500, an object type is selected as being of interest, and all content of that type is automatically collected as a user navigates through a plurality of content sources.

The method 500 starts at step 502, and proceeds to step 504. At step 504, the method 500 receives a plurality of open (i.e., currently available) content sources. These content sources may be open in a web browser and/or open software applications. The method 500 proceeds to step 506. At step 506, a selected object is received from a content source. The object may be an image, a text paragraph, a table, list, chart, diagram, and/or the like. The method 500 proceeds to step 508. At step 508, the method 500 receives a command to collect similar objects. The method 500 proceeds to step 510.

At step 510, all objects similar to the selected object are collected from all open content sources and copied into the collected content, in the manner described above. For example, a user may open a web browser and open Picasso, Flickr, a blog, an article and the like in different tabs of the web browser. The user may select for example, an image and then elects to collect similar objects (images). The method 500 proceeds to step 510.

At step 510, the method collects all objects of similar object type from all open web pages and applications and copies the similar objects into the collected content. If the object is an image, all images in all of the open content sources will be copied to the collected content. Similarly, if the object is a table, all tables in all of the open content sources will be copied to the collected content. The method 500 proceeds to step 512 and ends.

Figure 6:
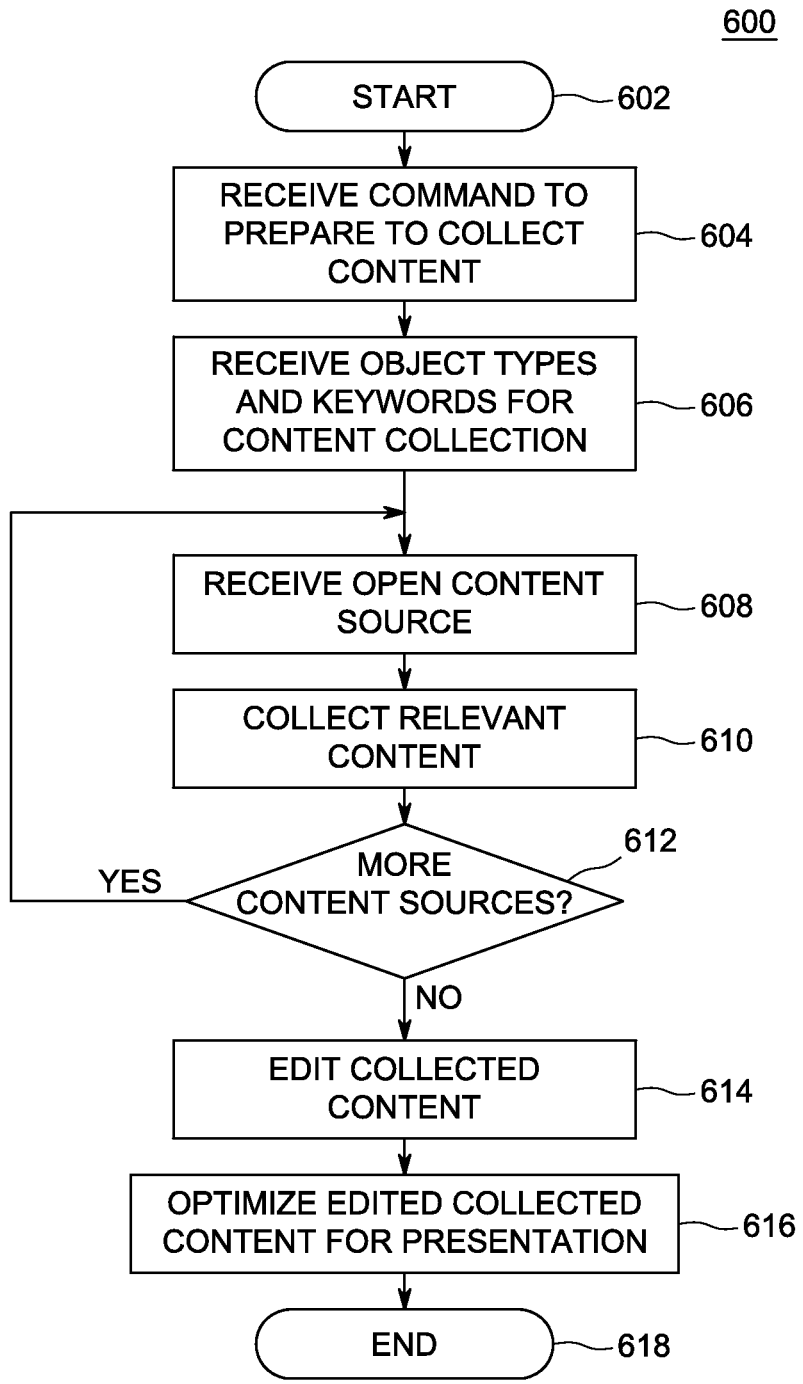
FIG. 6 depicts a flowchart of a method for collecting and merging content and optimizing the output content, as performed by the collection module of FIG. 1, according to one or more embodiments of the invention.

FIG. 6 depicts a flowchart of a method for collecting and merging content and optimizing the output content for presentation by display and/or printing, as performed by the collection applet 116 of FIG. 1, according to one or more embodiments of the invention.

The method 600 starts at step 602, and proceeds to step 604. At step 604, the method 600 receives a command to prepare to collect content. The method 600 proceeds to step 606. At step 606, the method 600 receives a selection of at least one type of object of which to collect. The method 600 also receives up to twenty (20) keywords for object collection. The method 600 proceeds to step 608. At step 608, the method 600 receives a content source. The method 600 proceeds to step 610. At step 610, the method 600 collects relevant content from the content source. The relevant content is all content of the at least one object type selected which also meets the criterion of the received keywords. The method 600 proceeds to step 612.

At step 612, the method 600 determines whether there are more content sources from which to collect content. If the method 600 determines there are more content sources from which to collect content, the method 600 proceeds to step 608. The method 600 iterates until there are no more content sources selected for collecting content. If at step 612, the method 600 determines there are no more content sources selected for collecting content, the method 600 proceeds to step 614.

At step 614, the method 600 provides for editing of the collected content. The collected content may be edited to reorder the collected content and to remove redundant information. The method 600 proceeds to step 616. At step 616, the method 600 formats the edited collected content to look like one cohesive document, rather than a collection of segregated objects. The method 600 optimizes the edited collected content in the layout for efficient presentation by display and paper-ink-usage when printed. In other words, the content is optimized to use minimal space and ink. The method 600 then prints the edited collected content in the paper-and-ink optimized format, or saves the document for display or printing at a later time. The method 600 proceeds to step 618 at which the method 600 ends.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium include the following: hard disks, optical storage devices, a transmission media such as those supporting the Internet or an Intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Example Computer System

Figure 7:
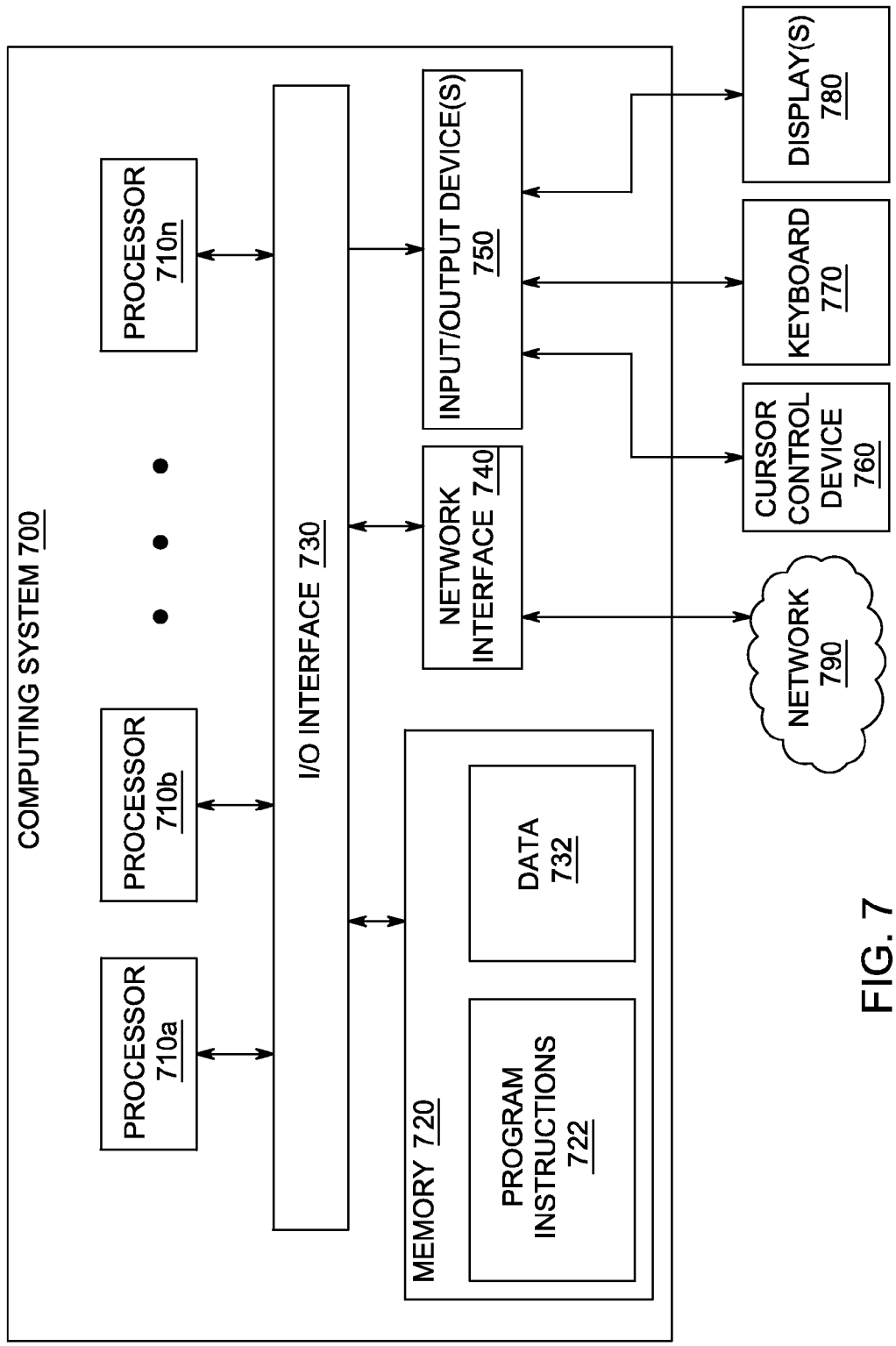
FIG. 7 depicts a computer system that can be utilized in various embodiments of the present invention, according to one or more embodiments of the invention.

FIG. 7 depicts a computer system that can be used to implement the methods of FIGS. 3-6 in various embodiments of the present invention, according to one or more embodiments of the invention. FIG. 7 depicts a computer system that can be utilized in various embodiments of the present invention to implement the computer 100, according to one or more embodiments.

Various embodiments of method and apparatus for collecting, merging, and presenting content, as described herein, may be executed on one or more computer systems, which may interact with various other devices. One such computer system is computer system 7 illustrated by FIG. 7, which may in various embodiments implement any of the elements or functionality illustrated in FIGS. 1-6. In various embodiments, computer system 700 may be configured to implement methods described above. The computer system 700 may be used to implement any other system, device, element, functionality or method of the above-described embodiments. In the illustrated embodiments, computer system 700 may be configured to implement methods 200, 300, 400, 500, as processor-executable executable program instructions 722 (e.g., program instructions executable by processor(s) 710) in various embodiments.

In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. In various embodiments, any of components may be utilized by the system to receive user input described above. In various embodiments, a user interface (e.g., user interface) may be generated and displayed on display 780. In some cases, it is contemplated that embodiments may be implemented using a single instance of computer system 700, while in other embodiments multiple such systems, or multiple nodes making up computer system 700, may be configured to host different portions or instances of various embodiments. For example, in one embodiment some elements may be implemented via one or more nodes of computer system 700 that are distinct from those nodes implementing other elements. In another example, multiple nodes may implement computer system 700 in a distributed manner.

In different embodiments, computer system 700 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs), such as the x96, PowerPC, SPARC, or MIPS ISAs, or any other suitable ISA. In multiprocessor systems, each of processors 710 may commonly, but not necessarily, implement the same ISA.

System memory 720 may be configured to store program instructions 722 and/or data 732 accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 720. In other embodiments, program instructions and/or data may be received, sent or stored upon different types of computer-accessible media or on similar media separate from system memory 720 or computer system 700.

In one embodiment, I/O interface 730 may be configured to coordinate I/O traffic between processor 710, system memory 720, and any peripheral devices in the device, including network interface 740 or other peripheral interfaces, such as input/output devices 750, In some embodiments, I/O interface 730 may perform any necessary protocol, timing or other data transformations to convert data signals from one components (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network (e.g., network 790), such as one or more external systems or between nodes of computer system 700. In various embodiments, network 790 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touch pads, scanning devices, voice or optical recognition devices, or any other devices suitable for entering or accessing data by one or more computer systems 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

In some embodiments, the illustrated computer system may implement any of the methods described above, such as the methods illustrated by the flowcharts of FIG. 3-FIG. 6. In other embodiments, different elements and data may be included.

Those skilled in the art will appreciate that computer system 700 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method for collecting, merging, and presenting selected content for printing comprising:
receiving, at a client device via a collection applet, a selection of an object type and an entry of at least one keyword, wherein the selected object type is an image;
receiving, at the client device, a selection of an activation option that activates the collection applet to collect objects that match the selected object type and the at least one keyword;
accessing a first content source through a first application;
based on the selection of the activation option, parsing the first content source to create a first internal map comprising a first list of one or more objects by object type;
based on the first internal map, collecting, by at least one processor of the client device, at least one object from the first content source matching the selected object type and the at least one keyword, the collected at least one object from the first content source having a first format and comprising text or one or more images;
storing the collected at least one object from the first content source in a common HTML format within a temporary file at the client device;
displaying, via the collection applet, the collected at least one object from the first content source in the common HTML format on an interface of the client device;
accessing a second content source through a second application;
based on the selection of the activation option, parsing the second content source to create a second internal map comprising a second list of one or more objects by object type;
based on the second internal map, collecting, by the at least one processor of the client device, at least one object from the second content source matching the selected object type and the at least one keyword, the collected at least one object from the second content source having a second format and comprising text or one or more images, wherein the first format, the second format, and the common HTML format each comprise different formats;
storing the collected at least one object from the second content source in the common HTML format within the temporary file at the client device;
displaying, via the collection applet, the collected at least one object from the first content source and the collected at least one object from the second content source in the common HTML format on the interface of the client device, such that the collected at least one object from the first content source and the collected at least one object from the second content source are displayed in a same font, size, and style; and
in response to a render command, merging the collected at least one object from the first content source and the collected at least one object from the second content source into a document and placing the collected at least one object from the first content source and the collected at least one object from the second content source in a layout.

2. The method of claim 1, wherein the render command comprises a request to activate a print cart renderer.

3. The method of claim 1, wherein collecting the at least one object from the first content source matching the selected object type and the at least one keyword comprises collecting the at least one object including content that the at least one keyword describes from the first content source.

4. The method of claim 1, wherein placing the collected at least one object from the first content source and the collected at least one object from the second content source in the layout comprises reducing a space between the collected at least one object from the first content source and the collected at least one object from the second content source.

5. The method of claim 1, wherein:
parsing the first content source to create the first internal map comprises parsing a first source document structure and a first object model to create the first internal map comprising the first list of one or more objects by object type; and parsing the second content source to create the second internal map comprises parsing a second source document structure and a second object model to create the second internal map comprising the second list of one or more objects by object type.

6. The method of claim 1, further comprising:
identifying an advertisement, header, footer, or navigation information within the collected at least one object from the first content source; and
wherein storing the collected at least one object from the first content source comprises removing the advertisement, header, footer, or navigation information from the collected at least one object from the first content source.

7. The method of claim 1, further comprising displaying the first content source in another interface of the client device adjacent to the interface of the client device within which the collected at least one object from the first content source is displayed.

8. The method of claim 1, further comprising:
converting, by the at least one processor of the client device, the one or more images into one or more image rasters.

9. A computer implemented method for collecting, merging and, presenting selected content comprising:
opening a first application to access a first content source;
opening a second application to access a second content source;
receiving, at a client device via a collection applet, a selection of at least one object type and an entry of at least one keyword, wherein the selected object type is an image;
receiving, at the client device, a selection of an activation option that activates the collection applet to collect objects that match the selected object type and the at least one keyword;
based on the selection of the activation option, collecting, by at least one processor of the client device, first content matching the selected at least one object type and the at least one keyword from the first content source, the collected first content from the first content source having a first format and comprising text or one or more images;
storing the collected first content from the first content source in a common HTML format within a print cart at the client device;
displaying, via the collection applet, the collected first content from the first content source in the common HTML format on an interface of the client device;
collecting, by the at least one processor of the client device, second content matching the selected at least one object type and the at least one keyword from the second content source, the collected second content from the second content source having a second format, wherein the first format, the second format, and the common HTML format each comprise different formats;
storing the collected second content from the second content source in the common HTML format within the print cart with the collected first content from the first content source;
displaying, via the collection applet, the collected first and second content from the first and second content sources in the common HTML format on the interface of the client device, such that the collected first and second content from the first and second content sources is displayed in a same font, size, and style; and
in response to a render command, merging the collected first and second content from the first and second content sources into a document and placing the collected first and second content from the first and second content sources in a layout.

10. The method of claim 9, wherein the render command comprises a request to activate a print cart renderer.

11. The method of claim 9, wherein collecting the second content matching the selected object type and the at least one keyword from the second content source comprises collecting the second content including content that the at least one keyword describes from the second content source.

12. The method of claim 9, further comprising:
identifying a first advertisement, first header, first footer, or first navigation information within the collected first content from the first content source; and
identifying a second advertisement, second header, second footer, or second navigation information within the collected second content from the second content source;
wherein storing the collected first content from the first content source and the collected second content from the second content source comprises removing the first advertisement, first header, first footer, or first navigation information from the collected first content from the first content source and removing the second advertisement, second header, second footer, or second navigation information from the collected second content from the second content source.

13. The method of claim 9, further comprising editing the collected first content from the first content source and editing the collected second content from the second content source.

14. The method of claim 9, further comprising:
converting, by the at least one processor of the client device, the one or more images into one or more image rasters.

15. A system for collecting, merging, and presenting selected content comprising:
at least one processor; and
a non-transitory computer readable storage medium comprising instructions, that when executed by the at least one processor, cause a client device to:
receive, via a collection applet, a selection of an object type and an entry of at least one keyword, wherein the selected object type is an image;
receive a selection of an activation option that activates the collection applet to collect objects that match the selected object type and the at least one keyword;
access a first content source through a first application;
based on the selection of the activation option, parse the first content source to create a first internal map comprising a first list of one or more objects by object type;
based on the first internal map, collect at least one object from the first content source matching the selected object type and the at least one keyword, the collected at least one object from the first content source having a first format and comprising text or one or more images;
store the collected at least one object from the first content source in a common HTML format within a temporary file;

display, via the collection applet, the collected at least one object from the first content source in the common HTML format on an interface of the client device;
access a second content source through a second application;
based on the selection of the activation option, parse the second content source to create a second internal map comprising a second list of one or more objects by object type;
based on the second internal map, collect at least one object from the second content source matching the selected object type and the at least one keyword, the collected at least one object from the second content source having a second format and comprising text or one or more images, wherein the first format, the second format, and the common HTML format each comprise different formats;
store the collected at least one object from the second content source in the common HTML format within the temporary file;
display, via the collection applet, the collected at least one object from the first content source and the collected at least one object from the second content source in the common HTML format on the interface of the client device; and
in response to a render command, merge the collected at least one object from the first content source and the collected at least one object from the second content source into a document and place the collected at least one object from the first content source and the collected at least one object from the second content source in a layout.

16. The system of claim 15, further comprising instructions, that when executed by the at least one processor, cause the client device to:
identify an advertisement, header, footer, or navigation information within the collected at least one object from the second content source;
wherein storing collected at least one object from the second content source comprises removing the advertisement, header, footer, or navigation information from the collected at least one object from the second content source.

17. The system of claim 15, wherein the temporary file allows editing the collected at least one object from the first content source and the collected at least one object from the second content source.

18. The system of claim 17, wherein the instructions, when executed by the at least one processor, cause the client device to merge the collected at least one object from the first content source with the collected at least one object from the second content source after editing of the collected at least one object from one or more of the first or second content source.

19. The system of claim 18, wherein the instructions, when executed by the at least one processor, cause the client device to display the first content source within another interface of the client device while displaying the collected at least one object from the first content source in the common HTML format within the interface of the client device.

20. The method of claim 9, wherein:
collecting the first content matching the selected at least one object type and the at least one keyword from the first content source comprises parsing the first content source to create a first internal map comprising a first list of one or more objects by object type; and
collecting the second content matching the selected at least one object type and the at least one keyword from the second content source comprises parsing the second content source to create a second internal map comprising a second list of one or more objects by object type.

* * * * *